(12) United States Patent
Xiao

(10) Patent No.: US 8,111,508 B2
(45) Date of Patent: Feb. 7, 2012

(54) HINGE AND FOLDABLE COMPUTING DEVICE USING THE SAME

(75) Inventor: Jin-Wei Xiao, Shenzhen (CN)

(73) Assignees: Fu Tai Hua Industry (Shenzhen) Co., Ltd., ShenZhen, Guangdong (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 90 days.

(21) Appl. No.: 12/825,541

(22) Filed: Jun. 29, 2010

(65) Prior Publication Data

US 2011/0128688 A1    Jun. 2, 2011

(30) Foreign Application Priority Data

Dec. 2, 2009    (CN) .......................... 2009 1 0310764

(51) Int. Cl.
*H05K 5/00*    (2006.01)
*H05K 7/00*    (2006.01)
*H04M 1/00*    (2006.01)

(52) U.S. Cl. ......... 361/679.27; 361/679.26; 361/679.28; 361/679.29; 455/575.1; 455/575.3

(58) Field of Classification Search ............. 361/679.01, 361/679.02, 679.55–679.59, 679.26–679.29, 361/679.21; 455/325, 556.1, 550.1, 90.1, 455/575.1; 70/357, 367, 406, 381, 491
See application file for complete search history.

(56) References Cited

U.S. PATENT DOCUMENTS

2005/0187024 A1* 8/2005 Cho et al. .................. 463/46
2006/0162122 A1* 7/2006 Satoh et al. ................ 16/221
* cited by examiner

*Primary Examiner* — Jayprakash N Gandhi
*Assistant Examiner* — Jerry Wu
(74) *Attorney, Agent, or Firm* — Altis Law Group, Inc.

(57) ABSTRACT

A hinge for rotatably connecting a lid to a base includes a first fixing member for being fixed to the lid, a second fixing member for being fixed to the base, a hollow member, and an axle member. The hollow member defines a chamber having a lateral surface. A protrusion protrudes from the lateral surface. The axle member includes a protruding wall received in the chamber, a first end and a second end extending out of the chamber, the first end is fixed to the first fixing member. The second end is rotatably connected to the second fixing member. The protruding wall cooperates with the protrusion to divide the chamber into a first chamber and a second chamber.

11 Claims, 4 Drawing Sheets

HINGE AND FOLDABLE COMPUTING DEVICE USING THE SAME

BACKGROUND

1. Technical Field

The present disclosure relates to hinges and, more particularly, to a hinge for connecting a lid to a base and capable of preventing the lid from rotating too rapidly.

2. Description of Related Art

A foldable computing device such as a notebook computer generally includes a frictional hinge to position a display. After repeatedly opening and closing of the display, the frictional hinge may no longer provide sufficient friction to maintain the positioning ability. The display may tend to rotate automatically from a desired position to a closed position unexpectedly and too rapidly, which may result in damage.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Embodiments of the present disclosure will now be described in detail below, with reference to the accompanying drawings.

Figure 1:
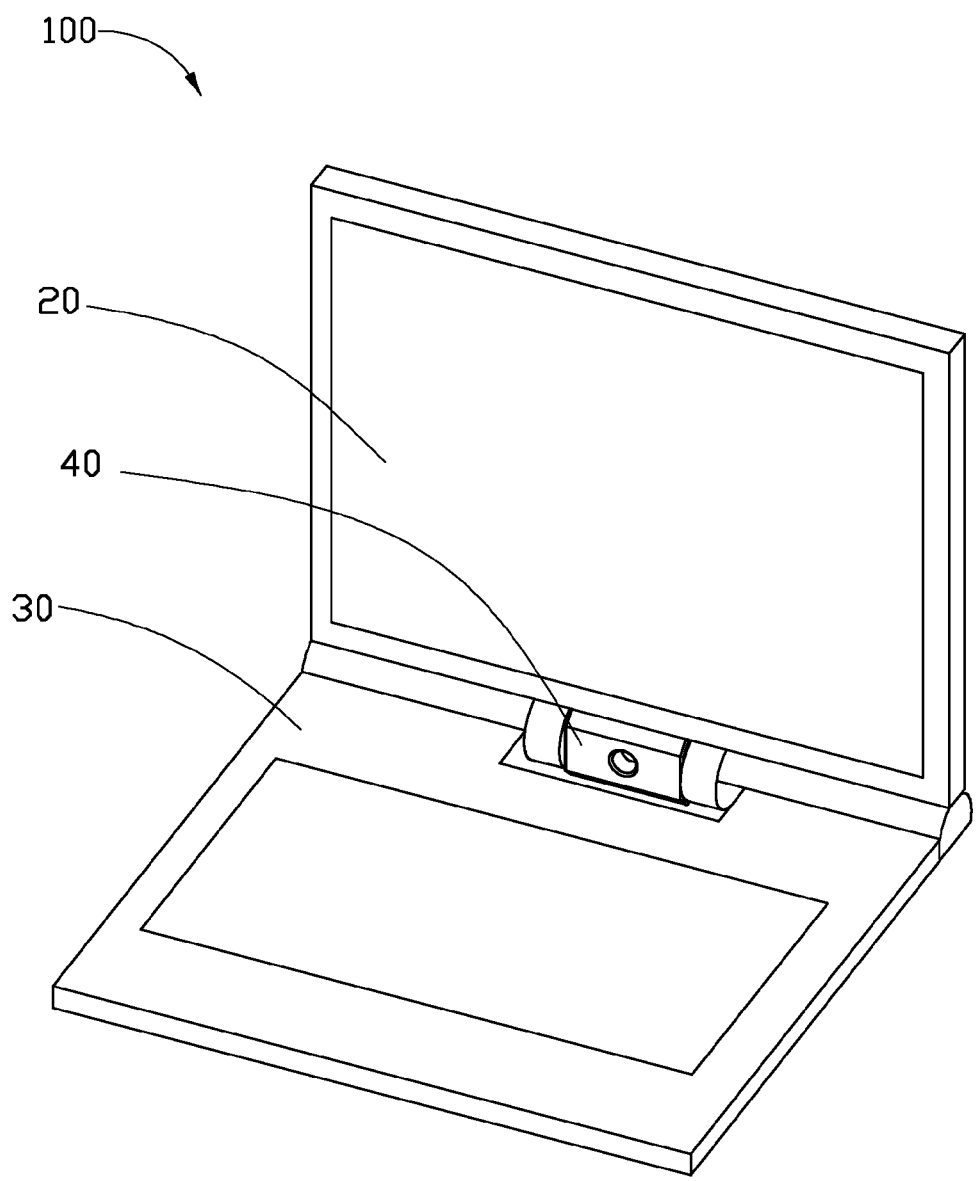
FIG. 1 is an isometric view of a foldable computing device in accordance with an exemplary embodiment.

Referring to FIG. 1, in an exemplary embodiment, a foldable computing device 100 includes a lid 20 and a base 30 rotatably connected to the lid 20 by a hinge 40. In the embodiment, the computing device 100 can be a laptop computer.

Figure 2:
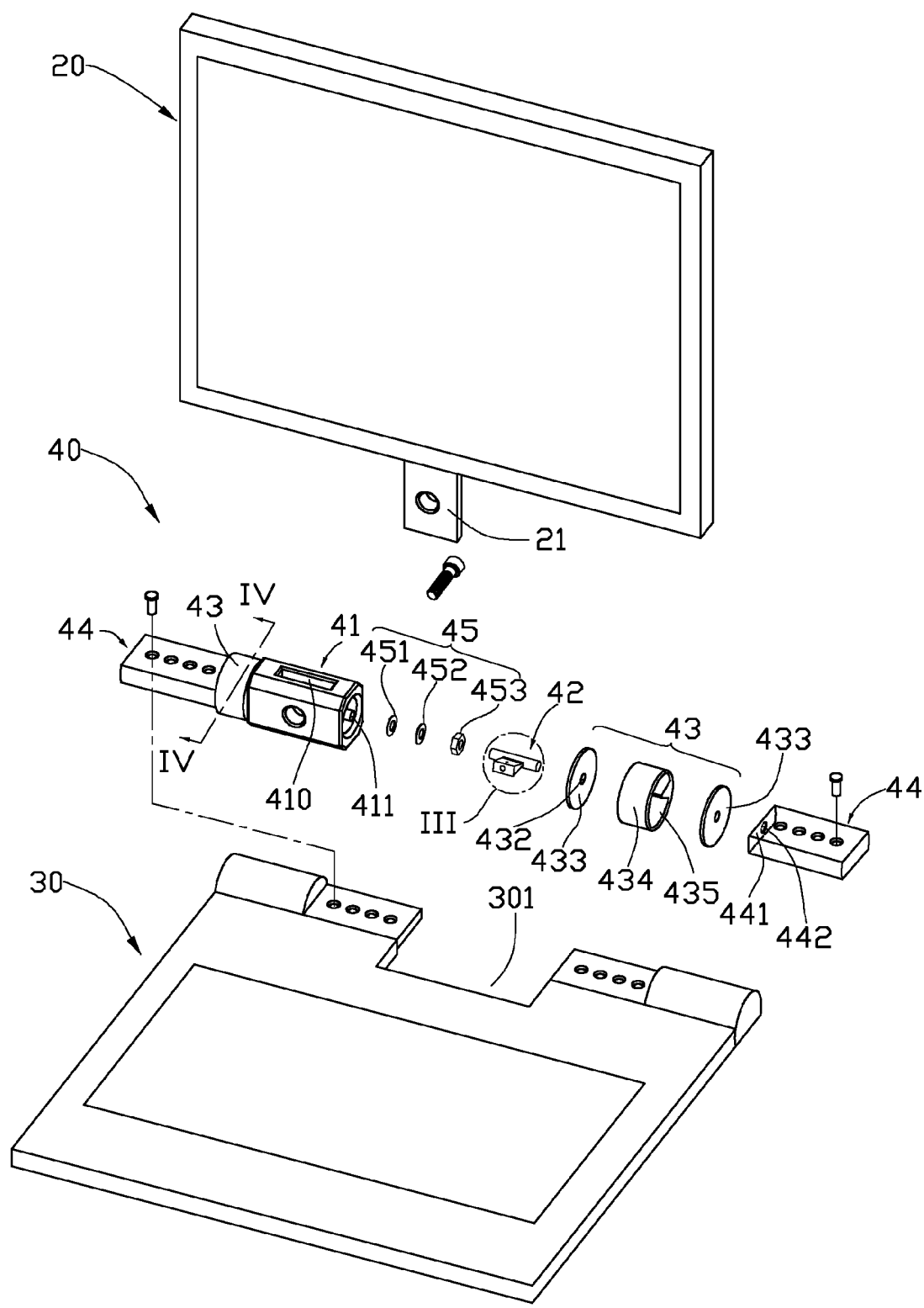
FIG. 2 is an exploded, isometric view of the computing device of FIG. 1.

Referring to FIG. 2, the lid 20 includes a tab 21 extending from its bottom. The base 30 defines an open-ended recess 301 in its rear end. The hinge 40 includes a first fixing member 41, two axle members 42 (one not shown) at opposite ends of the fixing member 41, two hollow members 43 and two second fixing members 44.

The first fixing member 41 is fixed on the lid 20 and arranged within the recess 301. In the embodiment, the first fixing member 41 defines a slot 410. The tab 21 is inserted in the slot 410 and secured by a fastener, such as a screw. The first fixing member 41 includes two rods 411 at two opposite ends thereof.

Each hollow member 43 includes a hollow tube 434, and two side caps 433 attached on opposite ends of the tube 434, thereby defining an enclosed chamber 435. The tube 434 includes a protrusion 431 on its inner lateral surface 4312 (see FIG. 4) that extends from one end to the other opposite end. Each cap 433 defines an opening 432. Each second fixing member 44 is fixed on the base 30 by fasteners, such as screws. A side surface 441 of each second fixing member 44 faces a corresponding hollow member 43 and defines an axle hole 442.

Figure 3:
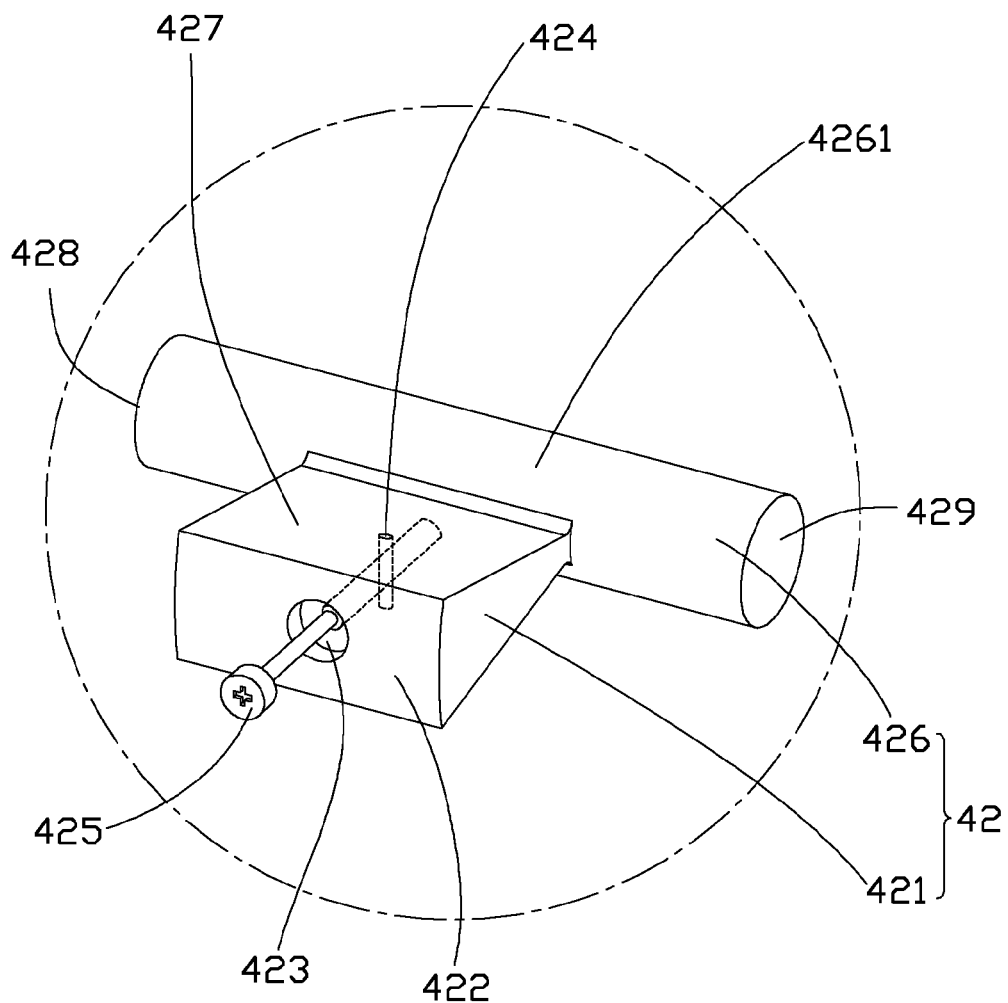
FIG. 3 is an enlarged view of a circled portion III of FIG. 2.

Referring to FIG. 3, the axle member 42 includes an axle 426 and a wall 421. The axle 426 includes a first end 428 and a second end 429. The wall 421 protrudes from the lateral surface 4261 of the axle 426 and extends along a longitudinal direction of the axle 426. The wall 421 has a length substantially equaling the width of the protrusion 431. A front surface 422 of the wall 421 defines an adjusting hole 423. A top surface 427 of the wall 421 defines a through hole 424 communicating with the adjusting hole 423. A pin 425 is threadedly engaged in the adjusting hole 423 and capable of moving to a position where at least part of the through hole 424 is blocked.

The axle 426 is received in the chamber 435 with the first end 428 and the second end 429 extending out of the openings 432, respectively. The first end 428 is fixed on the rod 411 of the first fixing member 41 by a connecting member 45. In the embodiment, the connecting member 45 includes a nut 453 and two washers 451 and 452. The second end 429 is rotatably frictionally received in the axle hole 442 of the second fixing member 44. The lid 20 is thus rotatably connected to the base 30 and can be set at a desired position by the friction between the second end 429 and the second fixing member 44.

Figure 4:
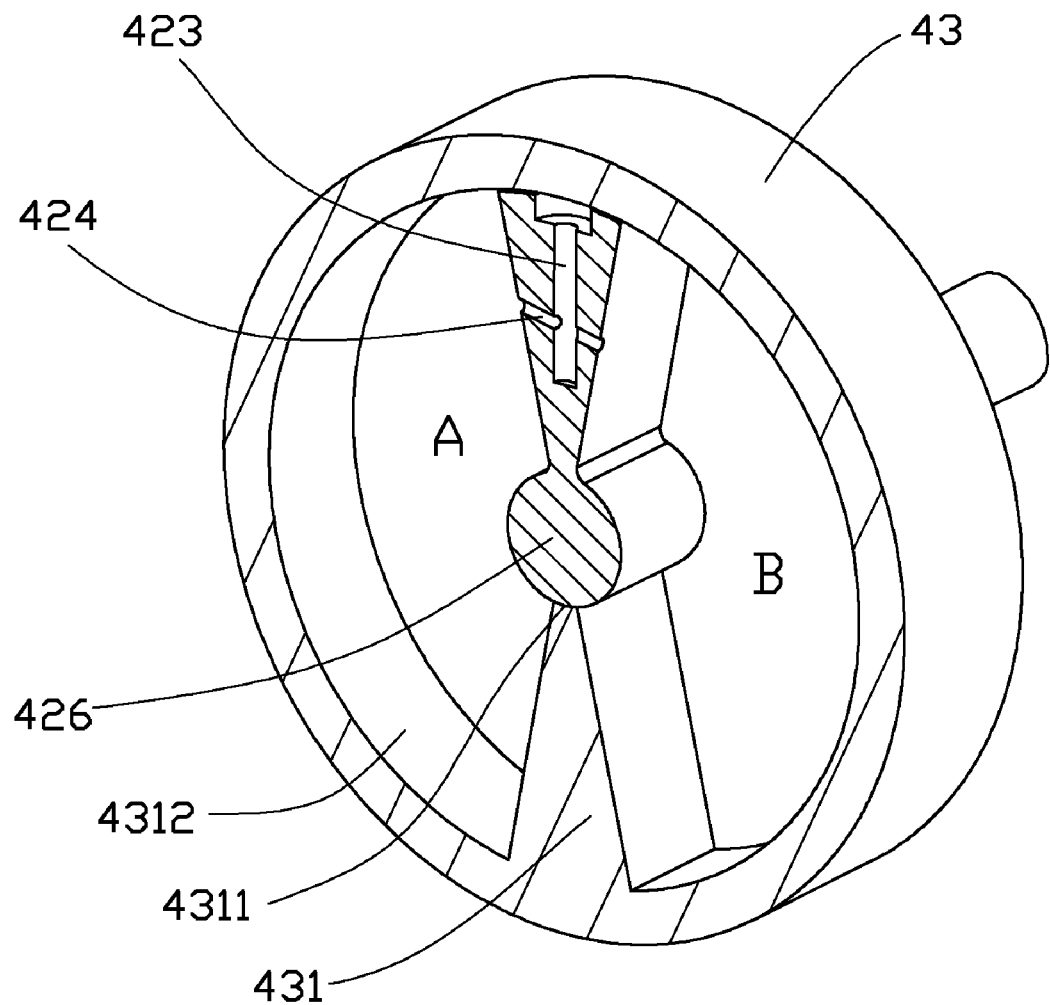
FIG. 4 is a cross-sectional view of showing the internal structure of a hollow member of FIG. 1, taken along line IV-IV of FIG. 2.

Referring to FIG. 4, the axle 426 rests on the top 4311 of the protrusion 431 and the front surface 422 of the wall 421 abuts against the lateral surface 4312 of the tube 434, dividing the chamber 435 into a chamber A and a chamber B. The top 4311 can be a cylindrical surface, such that the axle 426 rests tightly against the top 4311. The front surface 422 and the lateral surface 4312 can both be cylindrical for a tight mating. The through hole 424 then becomes the only passage for the air between the chamber A and the chamber B. As the wall 421 rotates together with the axle 426, the chamber A and the chamber B change in size. The chamber A or B whose size becomes smaller compresses the air therein, generating a resistance to stop the wall 421 until a balanced pressure between the chambers A and B is achieved, which prevents the lid 20 from rapidly rotating to a closed position when the second end 429 and the second fixing member 44 cannot provide sufficient friction.

While various embodiments have been described and illustrated, the disclosure is not to be constructed as being limited thereto. Various modifications can be made to the embodiments by those skilled in the art without departing from the true spirit and scope of the disclosure as defined by the appended claims.

What is claimed is:

1. A foldable computing device comprising:
    a base;
    a lid; and
    a hinge rotatably connecting the lid to the base, the hinge comprising:
        a first fixing member fixed to the lid;
        a second fixing member fixed to the base;
        a hollow member defining a closed chamber, the chamber having a lateral surface, and a protrusion protruding from the lateral surface; and
        an axle member comprising a protruding wall received in the closed chamber, a first end and a second end, the first end extending out of the closed chamber and being fixed to the first fixing member, the second end extending out of the closed chamber and being rotatably frictionally connected to the second fixing member, the protruding wall cooperating with the protrusion to divide the closed chamber into a first chamber and a second chamber;
    wherein, as the protruding wall rotates together with the axle member, the first chamber and the second chamber change in size, air flows between the first chamber and the second chamber until a balanced pressure is achieved.

2. The foldable computing device according to claim 1, wherein the hollow member comprises a hollow tube, a first side cap and a second side cap attached at opposite sides of the hollow tube, the first side cap and the second side cap each define an opening, the first end and the second end extend out of the closed chamber through the openings, respectively.

3. The foldable computing device according to claim 1, wherein the protruding wall defines a through hole configured for allowing the air to flow between the first chamber and the second chamber.

4. The foldable computing device according to claim 3, wherein the protruding wall further defines an adjusting hole communicating with the through hole, and a pin threadedly engaged in the adjusting hole, the pin is capable of moving to a position where the through hole is partly blocked.

5. A foldable computing device comprising:
a base;
a lid; and
a hinge rotatably connecting the lid to the base, the hinge comprising:
  a first fixing member fixed to the lid;
  a second fixing member fixed to the base;
  a hollow member defining a closed chamber, the chamber having a lateral surface, and a protrusion protruding from the lateral surface; and
  an axle member comprising an axle, and a wall protruding from an lateral surface of the axle and received in the closed chamber, the wall defining a through hole, the axle comprising a first end and a second end, the first end extending out of the closed chamber and being fixed to the first fixing member, the second end extending out of the closed chamber and being rotatably connected to the second fixing member, the axle resting on the protrusion, and the wall abutting against the lateral surface thereby dividing the closed chamber into a first chamber and a second chamber;
wherein, as the wall rotates together with the axle, the first chamber and the second chamber change in size, air flows between the first chamber and the second chamber through the through hole until a balanced pressure is achieved.

6. The foldable computing device according to claim 5, wherein the hollow member comprises a hollow tube, a first side cap and a second side cap attached at opposite sides of the hollow tube, the first side cap and the second side cap each define an opening, the first end and the second end extend out of the closed chamber through the openings, respectively.

7. The foldable computing device according to claim 5, wherein the wall further defines an adjusting hole communicating with the through hole, and a pin threadedly engaged in the adjusting hole, the pin is capable of moving to a position where the through hole is partly blocked.

8. A hinge for rotatably connecting a lid to a base, comprising:
a first fixing member for being fixed to the lid;
a second fixing member for being fixed to the base;
a hollow member defining a closed chamber, the chamber having a lateral surface, and a protrusion protruding from the lateral surface; and
an axle member comprising a protruding wall received in the closed chamber, a first end and a second end, the first end extending out of the closed chamber and being fixed to the first fixing member, the second end extending out of the closed chamber and being rotatably connected to the second fixing member, the protruding wall cooperating with the protrusion to divide the closed chamber into a first chamber and a second chamber;
wherein, as the protruding wall rotates together with the axle member, the first chamber and the second chamber change in size, air flows between the first chamber and the second chamber until a balanced pressure is achieved.

9. The hinge according to claim 8, wherein the hollow member comprises a hollow tube, a first side cap and a second side cap attached at opposite sides of the hollow tube, the first side cap and the second side cap each define an opening, the first end and the second end extend out of the closed chamber through the openings, respectively.

10. The hinge according to claim 8, wherein the protruding wall defines a through hole configured for allowing the air to flow between the first chamber and the second chamber.

11. The hing according to claim 10, wherein the protruding wall further defines an adjusting hole communicating with the through hole, and a pin threadedly engaged in the adjusting hole, the pin is capable of moving to a position where the through hole is partly blocked.

* * * * *